United States Patent
Schmotzer et al.

(10) Patent No.: US 8,871,131 B2
(45) Date of Patent: Oct. 28, 2014

(54) PROCESSES COMPRISING CROSSLINKING POLYETHYLENE OR USING CROSSLINKED POLYETHYLENE

(75) Inventors: Hans Schmotzer, Zurich (CH); Yvo Dirix, Erlenbach (CH); Paul Smith, Zurich (CH); Theo Tervoort, Zurich (CH); Lorenz Brunner, Zurich (CH)

(73) Assignee: Smith and Nephew Orthopaedics AG, Rotkreuz (CH)

( * ) Notice: Subject to any disclaimer, the term of this patent is extended or adjusted under 35 U.S.C. 154(b) by 978 days.

(21) Appl. No.: 12/447,866

(22) PCT Filed: Oct. 30, 2006

(86) PCT No.: PCT/EP2006/010423
§ 371 (c)(1),
(2), (4) Date: Apr. 29, 2009

(87) PCT Pub. No.: WO2008/052574
PCT Pub. Date: May 8, 2008

(65) Prior Publication Data
US 2010/0069576 A1     Mar. 18, 2010

(51) Int. Cl.
| | |
|---|---|
| *C08J 5/00* | (2006.01) |
| *C08J 5/16* | (2006.01) |
| *C08J 3/28* | (2006.01) |
| *C08J 3/24* | (2006.01) |
| *A61F 2/30* | (2006.01) |
| *A61F 2/02* | (2006.01) |
| *A61L 27/16* | (2006.01) |
| *A61L 27/14* | (2006.01) |
| *B29C 43/00* | (2006.01) |
| *B29L 31/00* | (2006.01) |
| *B29K 23/00* | (2006.01) |

(52) U.S. Cl.
CPC ....... *B29C 43/003* (2013.01); *B29L 2031/7532* (2013.01); *B29K 2023/0683* (2013.01); *B29C 43/006* (2013.01)
USPC ... 264/331.17; 264/494; 522/161; 623/18.11; 623/19.11; 623/20.31; 623/20.14; 623/20.15; 623/20.19; 623/20.22; 623/22.21; 623/22.11; 623/22.15

(58) Field of Classification Search
USPC .......................... 522/161, 157, 158, 184, 189; 623/18.11, 19.11, 20.311, 20.14, 623/20.15, 20.19, 20.22, 22.21, 22.15
See application file for complete search history.

(56) References Cited

U.S. PATENT DOCUMENTS

| | | | |
|---|---|---|---|
| 3,051,993 A | 9/1962 | Goldman et al. | |
| 4,323,531 A | 4/1982 | Bradley et al. | |

(Continued)

FOREIGN PATENT DOCUMENTS

| | | |
|---|---|---|
| CN | 1503682 A | 6/2004 |
| EP | 0 135 253 | 3/1985 |

(Continued)

OTHER PUBLICATIONS

Search Report in parent PCT application No. PCT/EP2006/010423, mailed Apr. 27, 2007.

(Continued)

*Primary Examiner* — Sanza McClendon
(74) *Attorney, Agent, or Firm* — Krieg DeVault LLP

(57) ABSTRACT

Provided are processes comprising crosslinking polyethylene or using crosslinked polyethylene. Furthermore, the processes may include compacting and/or sintering the polyethylene. The polyethylene can comprise virgin ultrahigh molecular weight polyethylene having a weight average molecular weight of at least 1,000,000 g/mol, to provide a compacted composition comprising virgin ultrahigh molecular weight polyethylene.

29 Claims, 3 Drawing Sheets

(56) References Cited

U.S. PATENT DOCUMENTS

| | | | |
|---|---|---|---|
| 4,587,163 A | 5/1986 | Zachariades | |
| 4,888,141 A | 12/1989 | Bastiaansen et al. | |
| 5,037,928 A | 8/1991 | Li et al. | |
| 5,414,049 A | 5/1995 | Sun et al. | |
| 5,449,745 A | 9/1995 | Sun et al. | |
| 5,543,471 A | 8/1996 | Sun et al. | |
| 5,577,368 A | 11/1996 | Hamilton et al. | |
| 5,621,070 A | 4/1997 | Howard, Jr. | |
| 5,650,485 A | 7/1997 | Sun et al. | |
| 5,721,334 A | 2/1998 | Burstein et al. | |
| 5,728,748 A | 3/1998 | Sun et al. | |
| 5,824,411 A | 10/1998 | Shalaby et al. | |
| 5,834,113 A | 11/1998 | Shalaby et al. | |
| 5,834,393 A | 11/1998 | Jacobsen et al. | |
| 5,879,400 A * | 3/1999 | Merrill et al. | 623/22.11 |
| 6,017,975 A | 1/2000 | Saum et al. | |
| 6,168,626 B1 | 1/2001 | Hyon et al. | |
| 6,228,900 B1 | 5/2001 | Shen et al. | |
| 6,281,264 B1 | 8/2001 | Salovey et al. | |
| 6,506,866 B2 | 1/2003 | Jacobsen et al. | |
| 6,548,612 B2 | 4/2003 | Smith et al. | |
| 6,737,165 B1 | 5/2004 | Smith et al. | |
| 6,800,670 B2 | 10/2004 | Shen et al. | |
| 6,846,869 B2 * | 1/2005 | Clark et al. | 524/427 |
| 7,160,623 B2 | 1/2007 | Smith et al. | |
| 7,276,287 B2 | 10/2007 | Smith et al. | |
| 7,364,685 B2 | 4/2008 | Schmotzer | |
| 7,863,410 B2 * | 1/2011 | Smith et al. | 528/480 |
| 8,063,175 B2 * | 11/2011 | Smith et al. | 528/480 |
| 8,324,291 B2 * | 12/2012 | Wang et al. | 523/115 |
| 2002/0161438 A1 | 10/2002 | Scott et al. | |
| 2004/0155381 A1 * | 8/2004 | Clark et al. | 264/319 |
| 2007/0265369 A1 * | 11/2007 | Muratoglu et al. | 522/157 |
| 2008/0085982 A1 | 4/2008 | Smith et al. | |
| 2011/0086993 A1 * | 4/2011 | Smith et al. | 526/249 |

FOREIGN PATENT DOCUMENTS

| | | |
|---|---|---|
| EP | 0 701 453 | 9/1998 |
| EP | 1 005 872 | 6/2000 |
| EP | 0 847 765 | 9/2000 |
| EP | 1 072 274 | 1/2001 |
| EP | 1 072 275 | 1/2001 |
| EP | 1 086 709 | 3/2001 |
| EP | 0 729 981 | 3/2002 |
| EP | 0 722 973 | 12/2003 |
| EP | 0 731 481 | 9/2004 |
| JP | 61-061821 | 3/1986 |
| JP | 63-118234 | 5/1988 |
| JP | 02-214647 | 8/1990 |
| JP | 2000-514481 | 10/2000 |
| JP | 2005-514496 | 5/2005 |
| JP | 2005-515917 | 6/2005 |
| JP | 2006-515237 | 5/2006 |
| WO | WO 95/06148 | 3/1995 |
| WO | WO 95/21212 | 8/1995 |
| WO | WO 97/29793 | 8/1997 |
| WO | WO 97/29895 | 8/1997 |
| WO | WO 98/01085 | 1/1998 |
| WO | WO 98/14223 | 4/1998 |
| WO | WO 98/16258 | 4/1998 |
| WO | WO 01/05337 | 1/2001 |
| WO | WO 03/031140 | 4/2003 |
| WO | WO 03/064141 | 8/2003 |
| WO | 2005/074619 A2 | 8/2005 |
| WO | WO 2005/074619 | 8/2005 |
| WO | WO 2005/074619 A2 | 8/2005 |
| WO | WO 2005/074619 | 9/2005 |
| WO | 2005/074619 A2 | 8/2008 |

OTHER PUBLICATIONS

Lada Corbeij-Kurelec; "Chain Mobility in Polymer Systems; On the Borderline between Solid and Melt"; Eindhoven; Tchnische Universiteit Eindhoven, 2001; Chapter 3.

Office Action issued in related European Patent Application No. 06 818 318.5-2102; dated Feb. 10, 2010 (5 pages).

Response to Office Action issued Feb. 10, 2010, in corresponding European Patent Application No. 06 818 318.5-2102; Dated Oct. 20, 2010 (12 pages).

Office Action issued in corresponding European Patent Application No. 06 818 318.5-2102; Dated Nov. 2, 2010 (6 pages).

Office Action issued in related Chinese Patent Application No. 200680056582.9; dated Feb. 10, 2011, and English translation thereof (19 pages).

Notification of the Second Office Action, State Intellectual Property Office of the People's Republic of China, Feb. 29, 2012, 18 pages.

Examiner's First Report on Patent Application No. 2006350369, Australian Government IP Australia, Aug. 17, 2011, 3 pages.

Canadian Office Action; Canadian Patent Application 2,669,386; Apr. 22, 2013 (2 pages).

First Office Action received in corresponding Chinese application No. 200680056582.9, and English translation thereof, dated Feb. 10, 2011, 19 pages.

Examiner's First Report received in corresponding Australian application No. 2006350369, dated Aug. 17, 2011, 3 pages.

English Abstract of CN1503682 retrieved from esp@cenet, Publication date Jun. 9, 2004, 1 page.

Notice of Reason for Rejection, Japanese Patent Office, Apr. 10, 2012, 7 pages.

* cited by examiner

PROCESSES COMPRISING CROSSLINKING POLYETHYLENE OR USING CROSSLINKED POLYETHYLENE

CROSS-REFERENCE TO RELATED APPLICATIONS

This application is a U.S. National Phase of the International Application No. PCT/EP2006/010423 filed 30 Oct. 2006 designating the U.S. and published in Engish on 8 May 2008 as WO 2008/052574.

BACKGROUND OF THE INVENTION

1. Field of the Invention

The present inventions relate to processes comprising crosslinking polyethylene or using crosslinked polyethylene, and to products obtained therewith.

2. Description of the Related Art

Ultrahigh molecular weight polyethylene (UHMW PE) is well known for, among other properties, its chemical resistance, low friction coefficient, high toughness, and resistance against wear. As a result, it has found numerous applications in demanding environments where some or all of the above properties are required. Equally well known is the intractability of this polymer, which is due to the fact that UHMW PE above its crystalline melting temperature, does not form a fluid phase that is of a viscosity that permits melt-processing techniques used with common thermoplastic polymers.

A negative consequence of the fact that above its crystalline melting temperature UHMW PE merely passes into a viscoelastic state, is that the original polymer particles soften but tend to substantially retain their shape. Even after relatively long sintering times at relatively high temperatures, much of the initial powder morphology may still remain. The latter, in fact, is thought to contribute to wear and ultimate failure of, for example, artificial implants made from this polymer. Attempts have been made to design processes that reduce wear. These processes are however relatively cumbersome, e.g. are ill defined, require melting the UHMW PE more than once, are time consuming, and/or substantially negatively influence other properties of the UHMWE PE such as, e.g., crack resistance.

SUMMARY OF THE INVENTIONS

In embodiment I, a process is provided comprising:
compacting a composition comprising virgin ultrahigh molecular weight polyethylene (UHMW PE), said UHMW PE having a weight average molecular weight of at least 1,000,000 g/mol, to provide a compacted composition comprising virgin UHMW PE;
sintering said compacted composition; and
crosslinking said UHMW PE.

Embodiment II includes embodiment I and further includes that the compacting occurs at a temperature in the range of 60-135° C.

Embodiment III includes embodiment I or II and further includes that the compacting is performed under shear.

Embodiment IV includes any one of embodiments I-III and further includes that the crosslinking is initiated before the sintering.

Embodiment V includes any one of embodiments I-III and further includes that the crosslinking is initiated during the sintering.

Embodiment VI includes any one of embodiments I-III and further includes that the crosslinking is initiated after the sintering.

Embodiment VII includes any one of embodiments I-VI and further includes that the compacting occurs in an inert atmosphere.

Embodiment VIII includes any one of embodiments I-VI and further includes that the compacting occurs in a reactive atmosphere.

In embodiment IX, a process is provided comprising:
providing a compacted composition, said compacted composition comprising virgin ultrahigh molecular weight polyethylene (UHMWPE), said UHMW PE having a weight average molecular weight of at least 1,000,000 g/mol; and
crosslinking said UHMWPE.

Embodiment X includes embodiment IX and further includes that the UHMWPE has a weight average molecular weight of at least 2,000,000 g/mol.

Embodiment XI includes embodiment IX or X and further includes sintering the composition.

Embodiment XII includes embodiment XI and further includes that the sintering occurs in an inert atmosphere.

Embodiment XIII includes embodiment XI and further includes that the sintering occurs in a reactive atmosphere.

Embodiment XIV includes any one of embodiments XI-XIII and further includes that the crosslinking is initiated before the sintering.

Embodiment XV includes any one of embodiments XI-XIII and further includes that the crosslinking is initiated during the sintering.

Embodiment XVI includes any one of embodiments XI-XIII and further includes cooling the sintered compacted polyethylene.

Embodiment XVII includes embodiment XVI and further includes that the crosslinking is initiated during the cooling.

Embodiment XVIII includes embodiment XVI or XVII and further includes that the cooling occurs at a rate of less than 10° C./hr.

Embodiment XIX includes any one of embodiments XVI-XVIII and further includes that the cooling is temporarily stopped at a temperature about 1-10° C. above the crystallization temperature of the UHMW PE.

Embodiment XX includes any one of embodiments I-XIX and further includes that the polyethylene is medical grade polyethylene.

Embodiment XXI includes embodiment XX and further includes swelling the crosslinked, sintered UHMW PE in one or more swelling agents.

Embodiment XXII includes any one of embodiments I-XXI and further includes that the composition consists essentially of the UHMW PE.

Embodiment XXIII includes any one of embodiments I-XXII and further includes that the composition comprises a linear polyethylene having a weight average molecular weight below 500,000 g/mol.

Embodiment XXIV includes any one of embodiments I-XXIII and further includes that the composition comprises a polyethylene having a weight average molecular weight below 25,000g/mol.

Embodiment XXV includes any one of embodiments I-XXIV and further includes that the compacted composition has the shape of a block.

Embodiment XXVI includes any one of embodiments I-XXV and further includes that the process is absent melting the UHMW PE other than during the sintering.

Embodiment XXVII includes any one of embodiments I-XXVI and further includes machining the crosslinked composition into a part of an orthopedic implant.

Embodiment XXVIII includes embodiment XXVII and further includes that the orthopedic implant is a hip cup or a part of an artificial knee.

Embodiment XXIX includes an article obtained by the process according to any one of embodiments I-XXVII.

Embodiment XXX includes an orthopedic implant comprising the article of embodiment XXIX.

In embodiment XXXI, a process is provided comprising:
providing a compacted composition comprising crosslinked virgin ultrahigh molecular weight polyethylene (UHMW PE); and
sintering the compacted composition.

Embodiment XXXII includes embodiment XXXI and further includes that the composition comprises, relative to the total weight of the composition, at least 75 wt% of the UHMW PE.

Embodiment XXXIII includes embodiment XXXI and further includes that the composition consists essentially of the UHMW PE.

In addition, in some embodiments there is provided a process comprising
providing an object consisting essentially of crosslinked compacted virgin polyethylene, and
sintering the object.

In embodiment XXXIV, a process is provided comprising:
sintering ultrahigh molecular weight polyethylene (UHMW PE); and
crosslinking said UHMW PE;
wherein said crosslinking is initiated more than once.

Embodiment XXXV includes embodiment XXXIV and further includes cooling the sintered UHMW PE.

Embodiment XXXVI includes embodiment XXXV and further includes that the crosslinking is initiated during the sintering and again during the cooling.

Embodiment XXXVII includes embodiment XXXVI and further includes that the crosslinking is effected with radiation, and the dose used during the sintering is smaller than the dose used during the cooling.

Embodiment XXXVIII includes any one of embodiments XXXIII-XXXVII and further includes that the process is absent compacting virgin UHMW PE before the sintering.

Embodiment XXXIX includes any one of embodiments XXXIII-XXXVIII and further includes that the process is absent melting the UHMW PE other than during the sintering.

Also provided are objects obtained with the present processes, such as orthopedic implants.

DETAILED DESCRIPTION OF THE PREFERRED EMBODIMENTS

Figure 1:
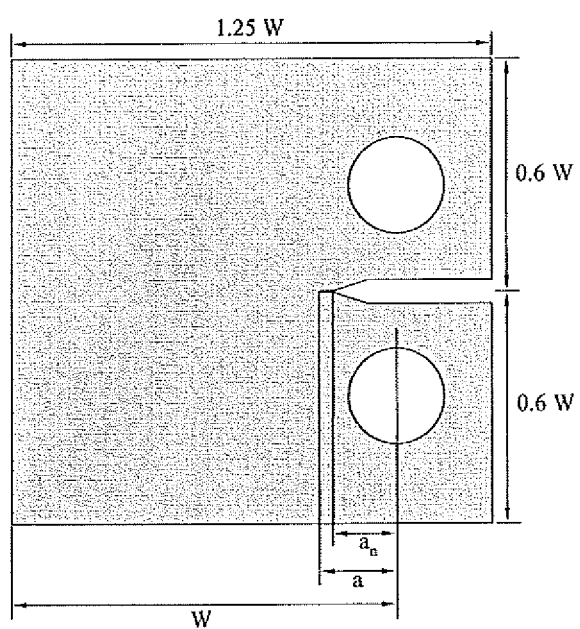
FIG. 1 is a schematic representation of a compact tension test specimen.

Provided are processes comprising crosslinking polyethylene or processes using crosslinked polyethylene. In some embodiments, the processes further involve compacting polyethylene and/or sintering polyethylene.

Polyethylenes

In some embodiments, the polyethylenes used in the present inventions are substantially linear polymers of ethylene.

In some embodiments, the polyethylene has a value of the weight-average molecular weight ($M_w$) of more than 1,000,000 g/mol, for instance more than 1,500,000, more than 2,000,000 g/mol, more than 3,000,000 g/mol, more than 4,000,000 g/mol, more than 5,000,000 g/mol, more than 6,000,000 g/mol, more than 7,000,000 g/mol, and even more than 10,000,000 g/mol. In some embodiments, the weight average molecular weight is below 20,000,000 g/mol, e.g. below 15,000,000 g/mol, below 10,000,000 g/mol, or below 8,000,000 g/mol.

The polydispersity (the ratio between the weight—and number average molecular weight) of the polyethylenes may vary. In some embodiments, the polydispersity is more than 1, for instance more than 2, more than 2.5, or more than 3. In some embodiments, the polydispersity is less than 100, for instance less than 75, less than 50, less than 20, less than 15, or less than 10.

In some embodiments, the polyethylene has a melting temperature of at least 105° C., for instance at least 115° C., at least 125° C., or at least 135° C. In this specification, unless indicated otherwise, "melting temperature" is the peak melting temperature of the polyethylene as determined in differential scanning calorimetry at a heating rate of 10° C./min, after first melting the polyethylene and recrystallizing it at a cooling rate of 10° C./min).

The UHMW PE grades for use in the present inventions can be synthesized according to conventional methods for the polymerization of ethylene as described in detail in the literature (for example, Whiteley, K. S., in Industrial Polymers Handbook, Wilkes, E. S. ed., Wiley-VCH, Volume 2, pp. 643-691, 2001) and as practiced in the art. Many UHMW PE grades are products of commerce, and may be used in the present inventions.

In some embodiments, the present inventions employ compositions comprising at least 35wt % UHMW PE, relative to the total weight of the composition. In some embodiments, the compositions comprise at least 50wt %, at least 65wt %, at least 75wt %, at least 90 wt %, at least 95wt %, or at least 99 wt % UHMW PE. In some embodiments, the compositions consist essentially of UHMW PE.

In some embodiments, the polyethylenes are "virgin" polymers. The term "virgin" is intended to mean that the polymer has not been molten or fully dissolved since its manufacture. Use of virgin polymers may assist in ease of processing when compared with non-virgin polymers. For instance, previously processed, e.g. sintered, UHMW PE would typically have an increased entanglement density when compared with virgin UHMW PE.

In some embodiments, the polyethylene is medical grade UHMWPE, as described by ASTM standards ASTM D4020, F648-00, F2003-00, F2102-01 and F2183-02, and ISO standards ISO 11542.1/.2 and 5834.1/.2.

Compacting

In some embodiments, the (composition comprising) polyethylene is compacted to form an object (e.g. a block) of compacted polyethylene. Compacting prior to further processing, e.g. sintering, may assist in providing a relatively better wear, impact strength, and/or fatigue crack growth resistance when compared with further processing without compacting. The manner of compacting may vary and depend, e.g., on the size of the object to be formed. In some embodiments, the compacting is effected at elevated temperatures and pressures (the temperature remains below the melting temperature of the polyethylene, however). In some embodiments, the compacting is effected by filling a mold with polyethylene and placing the mold in a press that is at a temperature below the melting temperature of the polyethylene. In some embodiments, the compacting temperature is at least 30° C., for instance at least 60° C., at least 80° C., at least 100° C., at least 110° C., at least 120° C., or at least 125° C. In some embodiments, the temperature is below 135° C., e.g. below 125° C., below 120° C., below 110° C., or below 100° C. In some embodiments, the temperature is about 120° C. Once placed in the press, pressure is applied to the mold. The pressure may be a single pressure or the pressure may be varied. For instance, an initial pressure of, e.g., at least 5 MPa, for instance at least 10 MPa, at least 15 MPa, or at least 20 MPa is applied, and held for a certain period of time (e.g. 5-60 minutes, for instance about 10 minutes or about 30 minutes), after which the pressure is raised to, e.g., at least 30 MPa, for instance at least 40 MPa, at least 50 MPa, or at least 60 MPa, after which the mold is allowed to cool down to room temperature (preferably under the applied pressure). The pressure may then be removed if still being applied and an object of compacted polyethylene is obtained.

In some embodiments, compacting is performed under shear. Compacting under shear generally enhances plastic deformation of the particles and may therewith improve particle contact. In some embodiments, compacting under shear is performed by solid-state extrusion, e.g. sheet extrusion, or rolling.

In some embodiments, compacting is performed in an air atmosphere. In some embodiments compacting is performed in an inert atmosphere, e.g. an argon or nitrogen atmosphere.

In some embodiments, compacting is performed in a reactive atmosphere, e.g. in an atmosphere comprising (effective amounts of) hydrogen, acetylene (ethyn), ethene, and/or propene.

In some embodiments, additives are added to the polyethylene prior to compacting. In some embodiments, the additives include radical scavengers, for instance vitamine E, vitamin A, vitamin C, phenolic antioxidants (e.g. BHT (E321, 2,6 ditertiarybutyl-4-methyl-phenol)), irganox 1010, carotenes (such as beta carotene), or mixtures thereof.

Sintering

In some embodiments, the (composition comprising) UHMW PE is sintered. In some embodiments, the composition/polyethylene is compacted before sintering. The manner of sintering may vary and may depend, e.g., on the shape and size of the object to be sintered. The temperatures at which the sintering is carried out are above the melting temperature of the polyethylene, but preferably below temperatures at which substantial degradation of the polymer may occur. In some embodiments, the sintering temperature is more than about 2° C. above the polyethylene melting temperature, for instance more than about 5° C., more than about 10° C., more than about 20° C., more than about 30° C., more than about 40° C., or more than about 50° C. Absent special precautions, such as the exclusion of oxygen, polyolefins may display signs of degradation at temperatures well above 200° C. Hence, in the absence of special precautions, sintering is preferably carried out at temperatures below 250° C., for instance below 230° C., below 210° C. or below 190° C. The time for completion of the sintering process may vary widely, and is dependent on, among other things, the size and shape of the object and the efficiency of heat transfer. In some embodiments, the sintering occurs in an inert atmosphere, e.g. an argon or a nitrogen atmosphere.

In some embodiments, the compacted polyethylene is sintered under pressure. The pressure applied during the sintering process may vary and depend, e.g., on the shape and dimensions of the object. In some embodiments, the pressure is at least 5 MPa, e.g. at least 10 MPa, at least 20 MPa, or at least 40 MPa. In some embodiments, the pressure is less than 500 MPa.

In some embodiments, a process is provided wherein the polyethylene is subjected only once to a temperature above its melting temperature.

In some embodiments, sintering is performed in a reactive atmosphere, e.g. in an atmosphere comprising (effective amounts of) hydrogen, acetylene (ethyn), ethene, and/or propene.

Crosslinking

The present processes comprise crosslinking polyethylene or using crosslinked polyethylene. Crosslinking may assist in further improving the wear resistance of the UHMW PE. In some embodiments, the crosslinking is initiated below the melting temperature of the UHMW PE. In some embodiments, the crosslinking is initiated after compacting but before sintering. In some embodiments, the crosslinking is initiated after compacting and during sintering (i.e. in the melt). In some embodiments, the crosslinking is initiated after compacting and after sintering (i.e. after or during cooling down from the melt). Crosslinking may be initiated, e.g., with reactive additives, with gamma radiation, with electron beam radiation, or combinations thereof. In some embodiments, the crosslinking is initiated with gamma radiation. The dose may vary and depend, e.g., on the size of the object and on whether a certain degree of polymer degradation would be acceptable. In some embodiments, the dose is at least 1 MRad, e.g. at least 4 MRad, at least 7 MRad, at least 10 MRad, at least 12 MRad, or at least 15 MRad. In some embodiments, the dose is at most 50 MRad, e.g. at most 35 MRad, at most 25 MRad, or at most 15 MRad. In some embodiments, the crosslinking is initiated with gamma radiation. In some embodiments, the crosslinking is initiated with electron beam radiation. The dose may vary and depend, e.g., on the size of the object and on whether a certain degree of polymer degradation would be acceptable. In some embodiments, the dose is at least 1 MRad, e.g. at least 4 MRad, at least 7 MRad, at least 10 MRad, at least 12 MRad, or at least 15 MRad. In some embodiments, the dose is at most 50 MRad, e.g. at most 35 MRad, at most 25 MRad, or at most 15 MRad, at most 10 MRad, or at most 8 MRad. The energy of the electron beam may vary and be, e.g., at least 100 keV, such as at least 500 keV, at least 1 MeV, at least 4 MeV, or at least 7 MeV. In some embodiments, the energy is below 20 MeV.

In some embodiments, crosslinking is initiated more than once, e.g. 2 times or 3 times. In some embodiments, crosslinking is initiated during compacting and again initiated during sintering. In some embodiments, crosslinking is initiated during sintering and again during cooling. In some embodiments, crosslinking is initiated during compacting, again initiated during sintering, and again initiated during cooling. In some embodiments, the initiation of crosslinking is at increasing dose. For instance, in some embodiments, the first time the dose of radiation is in the range of 1-4 Mrad and the second time the dose is between 4-7 Mrad.

While crosslinking may be beneficial for the wear resistance, it may decrease the crack propagation resistance. One of the possibilities to at least partially offset this potential disadvantage, is to increase the crystallinity of the material. In some embodiments, one or more of the following techniques are employed to keep the crystallinity at, or bring the crystallinity to, a relatively high level.

1. After sintering the polyethylene above the melting temperature of the polyethylene, the polyethylene is cooled down slowly from the melt, e.g. at a rate of less than 10° C./hr, e.g. less than 5° C./hr, less than 3° C./hr, or less than 1° C./hr. In embodiment, the cooling down is under elevated pressure.
2. After cooling down from the melt after sintering, the object is reheated and cooled down slowly (e.g. at the rates mentioned above under technique 1) under pressure (e.g. above 3 kbar).
3. After sintering, the polyethylene is annealed by cooling down from the melt just above the crystallization temperature (e.g. 1-10° C., for instance 1-5° C. or 1-3° C.) and holding the object at that temperature for a period of time.
4. The crosslinked object, which may or may not be a sintered object, is placed in a suitable solvent to swell the material and increase the mobility of the molecules in the system to favor the crystallization process. Examples of solvents include e.g. solvents in the liquid phase such as xylene, toluene, decaline but also in the supercritical phase such as supercritical $CO_2$, supercritical acetylene, supercritical hydrogen and supercritical ethene. Also radical scavengers may be used to swell the material, such as: vitamine E, vitamin A, vitamin C, phenolic antioxidants like BHT (E321, 2,6 ditertiarybutyl-4-methyl.phenol), irganox 1010, or carotenes such as beta carotene.
5. Nucleating or clarifying agents are added to the polyethylene before compacting. Such agents enhance the nucleation-crystallization process during cooling after sintering. In some embodiments, the nucleating or clarifing agents are added in an amount below 2 wt %, relative to the total weight of polyethylene. Nucleating and clarifying agents are known in the art and include for instance inorganic substances, such as talcum, metal oxides (e.g. titanium dioxide or magnesium oxide), phosphates, and carbonates or sulfates of, preferably, alkaline earth metals. Examples of organic nucleating or clarifying agents include for instance compounds based on sorbitol, for instance 1,3-2, 4-di(benzylidene)-D-sorbitol (MILLAD 3905, Milliken Chemical Co).
6. The compacted, crosslinked, and sintered object is deformed uniaxially in the solid-state. Upon deformation the crystals may rearrange and orient towards the orientation direction.
7. The compacted, crosslinked, and sintered object is deformed biaxially in the solid-state. Upon deformation the crystals may rearrange and increase the crystallinity.
8. Zone annealing the crosslinked polyethylene (preferably in a relatively small zone).
9. Adding one or more relatively low molecular weight polyethylene to the UHMWPE. In some embodiments, the one or more low molecular weight polyethylenes have a weight average molecular weight of less than 750,000 g/mol, e.g. less than 500,000 g/mol, such as less than 400,000 g/mol, less than 250,000 g/mol, less than 100,000 g/mol, less than 50,000 g/mol, less than 25,000 g/mol, less than 15,000 g/mol or even less than 5,000 g/mol. In some embodiments, the weight average molecular weight is at least 500 g/mol. In some embodiments, the one or more low molecular weight polyethylenes include a polyethylene that phase separates from the UHMWPE. In some embodiments, the one or more low molecular weight polyethylenes comprise, or consist essentially of, one or more polyethylenes with a polydispersity below 20, such as below 10, below 7, or below 4. In some embodiments, the one or more low molecular weight polyethylenes comprise, or consist essentially of, one or more linear polyethylenes. In some embodiments, one or more low molecular weight polyethylenes comprise, or consist essentially of, one or more polyethylenes that can crystallize relatively easily to crystals with nearly 100% crystallinity. In some embodiments, the amount of low molecular weight polyethylene in the polyethylene composition is, relative to the total weight of UHMW PE in the composition, less than 50 wt %, e.g. less than 30 wt %, less than 15 wt %, less than 10 wt %, less than 5 wt %, or less than 3 wt %. In some embodiments, the amount is at least 0.5 wt %, such as at least 1 wt %, at least 3 wt %, at least 5 wt %, or at least 8 wt %.

Applications

The products contemplated according to the present invention are numerous, and cover different fields of applications. Without limiting the scope and use of the present invention, some illustrative products are indicated herein.

In some embodiments, products include biomedical intermediates or products such as artificial implants, for instance orthopedic implants, e.g. parts of an artificial hip, of an artificial knee, of an artificial shoulder, of an artificial toe, of an artificial elbow, or an artificial ankle. Other examples include, e.g., products where the polyethylene forms part or the whole of an automotive part, an outdoor product, a composite material, a mono- or multi-filament fiber, an oriented or un-oriented fiber, a woven or non-woven fabric, a filter, a membrane, a film, a multi-layer- and/or multicomponent film, a barrier film, a container, a bag, a bottle, a rod, a liner, a vessel, a pipe, a valve, an O-ring, a gasket, ski soles, snow board soles, snow mobile runners, sliding parts (e.g. in printing devices, major appliances [dish washers, cloth washers, dryers, etc.], in automotive devices [steering systems, steel cable guides, etc.], in conveyor systems [flights], in elevators and escalators, and the like). Other examples of applications is in the fabrication of industrial parts with abrasion resistance uses such as bearings, sprockets, gaskets, ball valve seats, or conveyor belt parts.

EXAMPLES

—Materials:

In the below examples, the following materials were used:
GUR 1020 and GUR 4020 are virgin UHMW PE powders obtained from Ticona, both having a weight average molecular weight of about 3.5 million g/mol (Kurtz, S: M: et al, Biomaterials, 20, 1659, 1999).

—Compacting:

In the below examples, unless explicitly noted otherwise, compacting was performed as follows:
Samples were preheated to 120° C. in a hydraulic Carver press, model M 25T, while no pressure was applied to the samples. After 5 minutes, the pressure was raised to 20 MPa. After 10 minutes at 20 MPa, the samples were removed from the press and placed in a water-cooled Carver press, where they were quenched to ambient temperature under a pressure of 60 MPa.

—Sintering:

In the below examples, unless explicitly noted otherwise, sintering was performed as follows:
Samples were preheated to 200° C. in a hydraulic Carver press, model M 25T, while no pressure was applied to the samples. After 5 minutes, the pressure was raised to 10 MPa. After 10 minutes at 20 MPa, the samples were removed from the press and placed in a water-cooled Carver press, where they were quenched to ambient temperature under a pressure of 60 MPa.

—Charpy Impact

Charpy impact strength was determined on rectangular (120×15×10 mm), double notched test specimens prepared according to ISO 11542-2. All Charpy impact tests were performed on a Zwick 5113E pendulum impact tester according to ISO 179-1.

—Fatigue Crack Growth Resistance

For the crack propagation measurements, compact tension (CT) specimens were used according to ASTM E 647. The dimensions of the samples are depicted in FIG. 1, with W=32 mm, $a_n$=6.4 mm and sample thickness (B) was 6±0.1 mm. Before testing, each sample was pre-cracked with a sharp razor blade ($a-a_n$=1 mm).

Crack propagation measurements were performed on a Walter & Bai 10 kN servo-hydraulic testing machine according to ASTM E 647. Crack propagation was continuously recorded using a macro lens on a Canon EOS 20D single lens reflex camera without unclamping the samples during the measurements. Compact tension samples were subjected to tensile sinusoidal loading with a frequency of 5 Hz to avoid hysteretic heating of the samples. The load ratio R=$F_{min}/F_{max}$ was kept at R=0.1 and $F_{max}$ was incrementally increased to achieve approximately the same crack propagation rate for all samples.

Definition of the load applied for all crack propagation measurements.

According to the theory of elasticity of cracked bodies, the stress intensity factor range ΔK is a function of the applied load and the crack length relative to component size:

$$\Delta K = \Delta F \cdot \frac{F(\alpha)}{B \cdot \sqrt{W}}$$

where ΔF is the load amplitude of the fatigue cycle. F(α) is a geometric factor and α corresponds to a/W. The geometric factor for the compact tension geometry is defined as follows:

$$F(\alpha) = \frac{2+\alpha}{(1-\alpha)^{1.5}}(0.886 + 4.64\alpha - 13.32\alpha^2 + 14.72\alpha^3 - 5.6\alpha^4)$$

Crack growth rates during cyclic fatigue tests are related to the stress intensity factor range, ΔK, according to:

$$\frac{da}{dN} = C\Delta K^m$$

where N corresponds to the number of cycles and C and m are material constants. This so-called Paris law states that the crack propagation rate (da/dN) scales linearly with the stress intensity factor range (ΔK) on a log-log scale. A limiting stress intensity factor range can be defined which represents a service operating limit below which fatigue damage is highly unlikely. According to ASTM E 647, this threshold value, $\Delta K_{th}$, is associated with a crack propagation rate of $10^{-7}$ mm/cycle. Here, $\Delta K_{th}$ was calculated by determining the best-fit straight line from a linear regression of log da/dN versus log ΔK between the lowest detected growth rate and the onset of the log da/dN, log ΔK proportionality (in most cases between growth rates of $10^{-6}$ and $10^{-5}$ mm/cycle). Generally, a higher $\Delta K_{th}$ value can be related to a higher required stress intensity factor (or load amplitude) to initiate crack inception. All experiments were performed at room temperature.

—Wear Coefficient

Abrasive wear measurements were carried out using a custom-built device according to specifications and method analogous to those described by Hutchings [Trezona, R. I., Allsopp, D. N., Hutchings, I. M., Wear, 229, 205 (1999)]. In the device, a hard sphere (1" Tungsten Carbide ball with a 400 nm surface roughness, Atlas Ball & Bearing Co. Ltd., UK) clamped between two coaxial driving shafts, rotated at a constant speed of 150 rpm. The sample (circular with a diameter of 20 mm; thickness 0.6 mm) was placed against the ball with a normal force of 0.27 N, while an abrasive slurry (0.75 g SiC (mean particle size of 4-5 microns) per $cm^3$ distilled water) was dripping onto the ball at a feed rate of 5 $cm^3$/min. The size of the resulting abrasive wear crater was measured with an optical microscope. In all cases, spherical craters were observed; the corresponding wear volume V was calculated according to:

$$V = \pi d^4/(64R)$$

where R is the ball radius and d is the surface chordal diameter of the crater [Rutherford, K. L., Hutchings, I. M., J Test. Eval., 25, 250 (1997)]. To correct the measured diameter of the wear craters (d.sup.1), which typically consist of a central spherical crater surrounded by a roughened or 'scuffed' annular region, the following empirical rule (according to Trezona et al. [Trezona, R. I., Hutchings, I. M., Wear, 235, 209 (1999)]) was applied:

$$d = (d' - 0.1407)/0.9358 \text{ for } 0.5 \text{ mm} \le d \le 2.193$$

$$d = d' \text{ for } d > 2.193 \text{ mm}$$

For abrasive wear of homogeneous materials the wear volume is expected to be proportional to the product of the sliding distance S and the normal force N:

$$V = \kappa \times S \times N$$

which defines the wear coefficient κ.

Example 1

GUR 4020 was sintered, and the charpy impact of the sintered GUR 4020 was determined to be 191 kJ/$M^2$.

Example 2

Example 1 was repeated, except that GUR 4020 was compacted before sintering. The charpy impact of the compacted and sintered GUR 4020 was determined to be 202 kJ/$M^2$.

Example 3

GUR 1020 was sintered, and the fatigue crack growth resistance of the sintered GUR 1020 was determined to be 1.25 MPa/$m^{1/2}$.

Example 4

Example 3 was repeated, except that GUR 1020 was compacted before sintering. The fatigue crack growth resistance of the compacted and sintered GUR 1020 was determined to be 1.32 MPa/$m^{1/2}$.

Example 5

Figure 2:
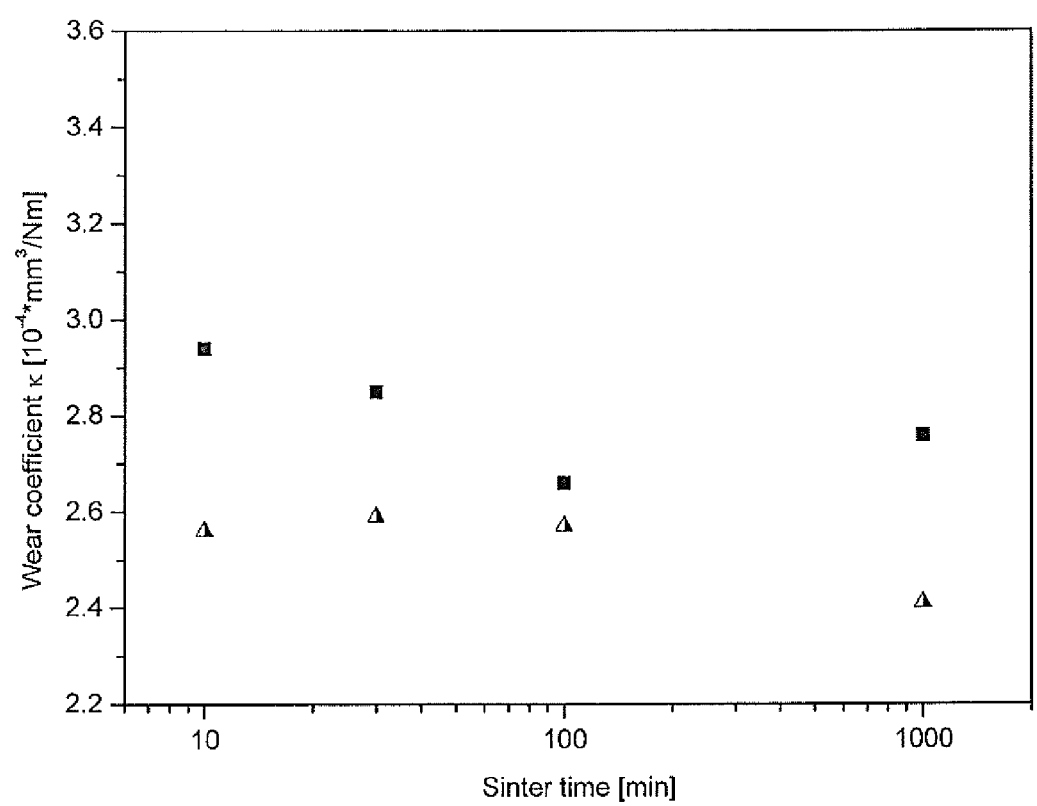
FIG. 2 represents results of wear coefficient measurements as a function of sintering time (x-axis).

Various samples of GUR 4120 were sintered according to the procedure mentioned above in the introductory part of this Example section, except that not all samples remained for 10 minutes under 20 MPa at 200° C. Specifically, samples were prepared that were held, respectively, for 10 minutes (i.e., the regular procedure), 30 minutes, 100 minutes, and 1000 minutes under 20 MPa at 200° C. The wear coefficient of these samples was determined and is shown as triangles in FIG. 2.

Example 6

Example 5 was repeated, except that all samples were compacted before sintering. The wear coefficient of these samples was determined and is shown as squares in FIG. 2.

Example 7

Figure 3:
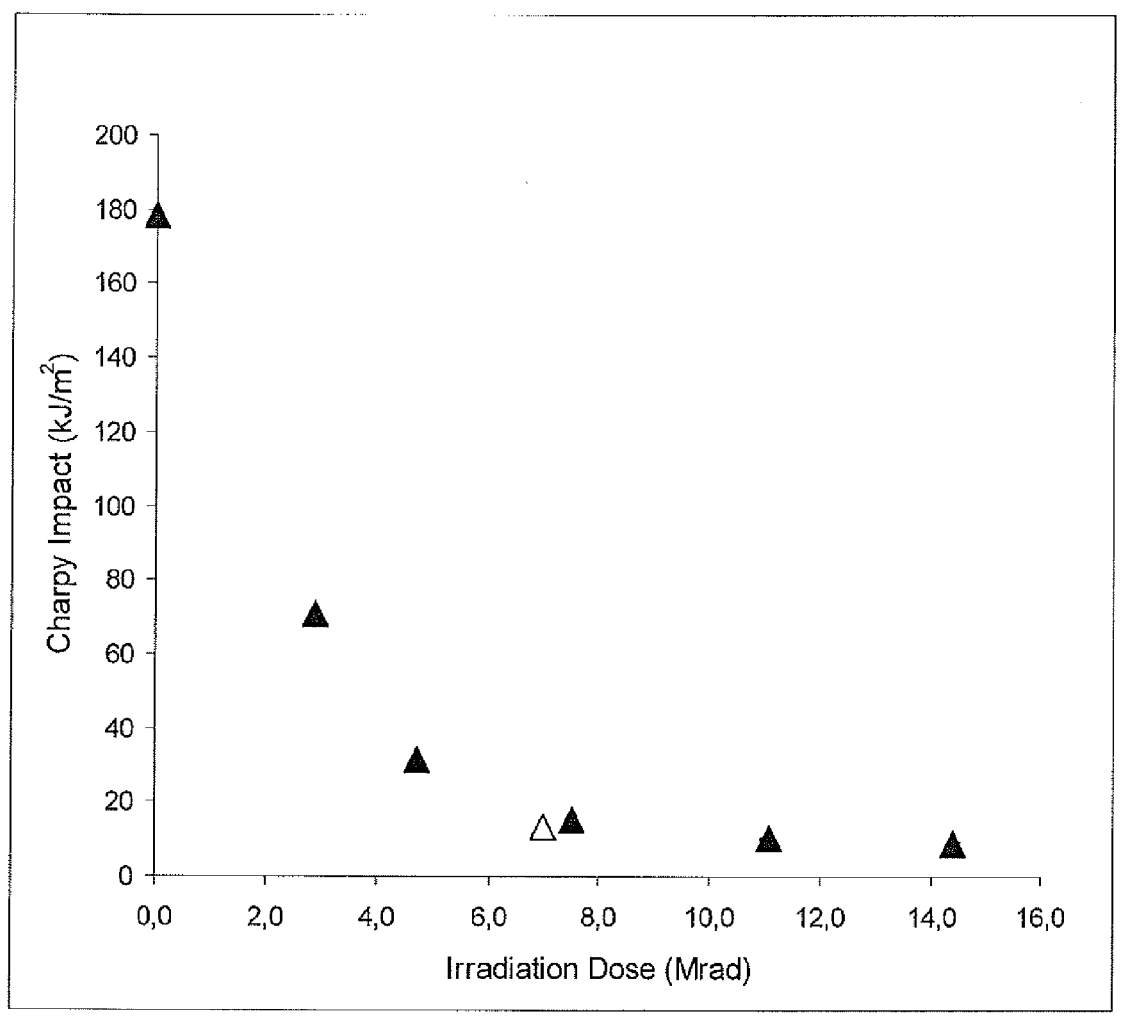
FIG. 3 represents results of charpy impact strength measurements as a function of irradiation dose.

Samples of GUR 4020 were compacted. The compacted samples were irradiated at room temperature with gamma rays or with electrons (10 MeV) at room temperature. The dose of gamma radiation that the samples received differed among the samples and ranged from 0 to 15 MRad. Samples that instead received electron (e-beam) radiation all received a dose of 7 MRad. Subsequently, the samples were sintered and their Charpy impact strength was determined. The results are shown in FIG. 3, with the gamma irradiated samples indicated as closed triangles (▲) and the e-beam sample as an open triangle (Δ).

Example 8

Samples of GUR 1020 were compacted and subsequently sintered. The thus obtained samples were irradiated with E-beam at 125° C. and at a dose of 7 MRad, followed by thermal treatment for 9 hours at 150° C. (which is above the melting temperature of GUR 1020). After these 9 hours, the samples were allowed to cool down to room temperature. The fatigue crack growth resistance of the thus obtained samples was determined to be 0.92 MPa/m$^{1/2}$.

Example 9

Example 8 was repeated, except that the compaction was omitted. The fatigue crack growth resistance of the thus obtained samples was determined to be 0.84 MPa/m$^{1/2}$.

Example 10

Samples of GUR 1020 were compacted. The compacted samples were sintered, and during sintering the samples were irradiated with E-beam at a dose of 7 MRad. Thus, the crosslinking was initiated after compaction but during sintering (melt irradiation). The fatigue crack growth resistance of the thus obtained samples was determined to be 0.89 MPa/m$^{1/2}$.

Having described specific embodiments of the present inventions, it will be understood that many modifications thereof will readily appear or may be suggested to those skilled in the art, and it is intended therefore that these inventions are limited only by the spirit and scope of the following claims.

What is claimed is:

1. A process comprising:
   compacting a composition comprising virgin ultrahigh molecular weight polyethylene (UHMW PE), said UHMW PE having a weight average molecular weight of at least 1,000,000 g/mol, to provide a compacted composition comprising virgin UHMW PE;
   sintering said compacted composition; and
   crosslinking said UHMW PE; and
   wherein said compacting occurs at a temperature in the range of 60-135° C.; and
   wherein said compacting is performed under shear.

2. A process comprising:
   compacting a composition comprising virgin ultrahigh molecular weight polyethylene (UHMW PE), said UHMW PE having a weight average molecular weight of at least 1,000,000 g/mol, to provide a compacted composition comprising virgin UHMW PE;
   sintering said compacted composition; and
   crosslinking said UHMW PE; and
   wherein said crosslinking is initiated before said sintering.

3. A process comprising:
   compacting a composition comprising virgin ultrahigh molecular weight polyethylene (UHMW PE), said UHMW PE having a weight average molecular weight of at least 1,000,000 g/mol, to provide a compacted composition comprising virgin UHMW PE;
   sintering said compacted composition; and
   crosslinking said UHMW PE; and
   wherein said crosslinking is initiated during said sintering.

4. The process according to claim 1, wherein said crosslinking is initiated after said sintering.

5. A process comprising:
   compacting a composition comprising virgin ultrahigh molecular weight polyethylene (UHMW PE), said UHMW PE having a weight average molecular weight of at least 1,000,000 g/mol, to provide a compacted composition comprising virgin UHMW PE;
   sintering said compacted composition; and
   crosslinking said UHMW PE; and
   wherein said compacting occurs in an inert atmosphere.

6. A process comprising:
   compacting a composition comprising virgin ultrahigh molecular weight polyethylene (UHMW PE), said UHMW PE having a weight average molecular weight of at least 1,000,000 g/mol, to provide a compacted composition comprising virgin UHMW PE;
   sintering said compacted composition; and
   crosslinking said UHMW PE; and
   wherein said compacting occurs in a reactive atmosphere.

7. A process comprising:
   providing a compacted composition, said compacted composition comprising virgin ultrahigh molecular weight polyethylene (UHMW PE), said UHMW PE having a weight average molecular weight of at least 1,000,000 g/mol;
   crosslinking the UHMWPE;
   sintering the composition; and
   cooling the sintered compacted polyethylene at a rate of less than 10° C/hr.

8. The process of claim 7, wherein said UHMW PE has a weight average molecular weight of at least 2,000,000 g/mol.

9. The process according to claim 7, wherein said sintering occurs in an inert atmosphere.

10. The process according to claim 7, wherein said sintering occurs in a reactive atmosphere.

11. The process according to claim 7, wherein said crosslinking is initiated before said sintering.

12. The process according to claim 7, wherein said crosslinking is initiated during said sintering.

13. The process according to claim 7, wherein said crosslinking is initiated during said cooling.

14. A process comprising:
   providing a compacted composition, said compacted composition comprising virgin ultrahigh molecular weight polyethylene (UHMW PE), said UHMW PE having a weight average molecular weight of at least 1,000,000 g/mol;
crosslinking the UHMWPE;
sintering the composition; and
cooling the sintered compacted polyethylene; and
wherein said cooling is temporarily stopped at a temperature about 1-10° C. above the crystallization temperature of said UHMW PE.

15. The process according to claim 7, wherein said polyethylene is medical grade polyethylene.

16. The process according to claim 7, wherein said composition consists essentially of said UHMW PE.

17. The process according to claim 7, wherein said composition comprises a linear polyethylene having a weight average molecular weight below 500,000 g/mol.

18. The process according to claim 7, wherein said composition comprises a polyethylene having a weight average molecular weight below 25,000 g/mol.

19. The process according to claim 7, wherein said compacted composition has the shape of a block.

20. The process according to claim 7, wherein said process is absent melting the UHMW PE other than during said sintering.

21. The process according to claim 7, further comprising machining the crosslinked composition into a part of an orthopedic implant.

22. The process of claim 21, wherein said orthopedic implant is a hip cup or a part of an artificial knee.

23. An article obtained by the process according to claim 7.

24. An orthopedic implant comprising the article of claim 23.

25. The process of claim 7, wherein said composition comprises, relative to the total weight of said composition, at least 75 wt % of said UHMW PE.

26. A process comprising:
sintering ultrahigh molecular weight polyethylene (UHMW PE);
initiating a first crosslinking of said UHMW PE during said sintering;
cooling the sintered UHMW PE; and
initiating a second crosslinking of said UHMW PE during said cooling.

27. The process of claim 26, wherein said crosslinking is effected with radiation, and the dose used during said sintering is smaller than the dose used during said cooling.

28. A process comprising:
compacting a composition comprising virgin ultrahigh molecular weight polyethylene (UHMW PE), said UHMW PE having a weight average molecular weight of at least 1,000,000 g/mol, to provide a compacted composition comprising virgin UHMW PE;
sintering said compacted composition; and
crosslinking said UHMW PE; and
wherein said compacting is performed under shear.

29. The process according to claim 5, wherein said crosslinking is initiated after said sintering.

* * * * *